US Patent [15] 3,668,129
Willett [45] June 6, 1972

[54] DRILLING FLUID COMPOSITION AND ADDITIVE THEREFOR

[72] Inventor: Robert P. Willett, 5948 North Market Street, Shreveport, La. 71107

[22] Filed: June 3, 1970

[21] Appl. No.: 43,201

[52] U.S. Cl. ............................ 252/8.5 P, 252/357, 260/404
[51] Int. Cl. ..................................................... C10m 3/26
[58] Field of Search .......................... 252/8.5 P, 51.5 A, 357; 260/404

[56] References Cited

UNITED STATES PATENTS

| | | | |
|---|---|---|---|
| 2,282,646 | 5/1942 | DeGroote et al. | 260/404 |
| 2,520,381 | 8/1950 | Carnes | 260/404 |
| 2,555,794 | 6/1951 | Henkes | 252/8.5 |
| 2,773,030 | 12/1956 | Tailleur | 252/8.5 |
| 2,805,201 | 9/1957 | Fischer | 252/8.55 |
| 3,281,358 | 10/1966 | Furey | 252/51.5 X |

Primary Examiner—Herbert B. Guynn
Attorney—Cushman, Darby & Cushman

[57] ABSTRACT

An aqueous drilling fluid contains a drilling fluid additive which comprises a mixture of a hydrocarbon oil containing an emulsifying agent in amounts sufficient to produce a stable emulsion of the oil in water and an ethylene oxide adduct of an ester of a polyalkanolamine and a high molecular weight polybasic fatty acid. The adduct contains sufficient ethylene oxide units to render the adduct water soluble. Optionally, the additive contains a water-soluble surfactant.

13 Claims, No Drawings

DRILLING FLUID COMPOSITION AND ADDITIVE THEREFOR

This invention relates to drilling fluids and more particularly to a drilling fluid additive which imparts highly desirable characteristics to a drilling fluid when included therein.

It is well known that in perforating the earthen formation to tap subterranean deposits such as gas or oil, the perforation is accomplished by well drilling tools and a drilling fluid. The drilling fluid serves to remove the material loosened by the drilling tools, such as a drilling bit, to deposit a cake or layer on the walls of the well and within the pore spaces and crevices of the wall rocks, thereby sealing the porous formation and reducing water loss, to lubricate the drilling tools such as associated drill pipe, thereby reducing frictional power loss, to absorb heat generated by the drill bit, by stress on the drill pipe and by continuous frictional drag of the rotating pipe on the walls of the well and to seal off high pressure gas, oil or water yielding horizons so that such fluids cannot enter the well bore during the drilling operation.

An important economic consideration in well drilling operations is the expenditure for electrical power requirements and it is known that in any specific area power requirements increase as the well is deepened, thus necessitating the installation of a power plant of sufficient capacity to provide power in amounts required to reach any given contract depth. Factors which contribute to excessive power consumption in well drilling operations include the friction between the drill pipe and bit and the surrounding drilling fluid, as well as frictional drag which is defined as the apparent weight of the pipe string when lifted off the bottom of the well less the known weight of the pipe.

Another important consideration in the attainment of an efficient well drilling operation is the provision of a drilling fluid which is characterized as a uniform and stable system as evidenced, for instance, by its tolerance to inorganic salts encountered in the drilling operation.

Accordingly, it is an object of this invention to provide a drilling fluid additive which when introduced in minor amounts into conventional drilling fluids produces a marked reduction in power requirements, a more stable and uniform drilling fluid composition and rapid and improved washing of the cuttings produced.

A further object of the present invention is the provision of a drilling fluid which contains only minor amounts of petroleum oil products, thereby avoiding pollution problems in the ultimate disposal of the cuttings, wash water or discarded or expended fluid during conventional well drilling operations.

Further objects and advantages of this invention will become apparent to those skilled in the art after studying the disclosure of the invention including the detailed description of the invention.

The drilling fluid additive of this invention is incorporated into a base drilling fluid in amounts ranging from about 1 to 100 parts by volume of said additive to 2,000 parts by volume of said base drilling fluid.

The base drilling fluid composition to which the novel drilling fluid additive of this invention is added can be any conventional drilling fluid composition.

Broadly, the invention contemplates a novel drilling fluid additive, which consists essentially of a mixture of (a) a hydrocarbon oil containing a surfactant or emulsifier in amounts sufficient to produce a stable emulsion in water, (b) an ethylene oxide adduct of an ester of a polyalkanolamine and a high molecular weight polybasic fatty acid and, optionally, (c) a water soluble surfactant.

Generally, the mixture contains 25 to 90 volume percent component (a) and, preferably, about 75 volume percent, while component (b) is present in amounts of about 5 to 50 volume percent, preferably, about 20 volume percent. Component (c) is present in amounts ranging from zero to 25 volume percent, preferably, about 5 volume percent of said mixture.

a. The hydrocarbon oil used in the formulation of this component may range from 35 to 200 Saybolt viscosity at 100° F and may be an unrefined, semi-refined or highly refined product. Because of nominal costs, ready availability and ease in blending and handling, a petroleum oil having a Saybolt viscosity of 35 to 100 seconds at 100° F and an ASTM pour point of 45° F or below is preferably employed. A minimum TOC flash point of 150° F is desirable for safety reasons. Oils containing some unsaturated or aromatic hydrocarbons blend more readily with the other components of the additive of this invention, but saturated hydrocarbons may be used.

The surfactant used with the hydrocarbon oil to produce a component emulsifiable in water can be any one of several surfactants but it must be capable of producing stable emulsions of the selected hydrocarbon oil with waters containing calcium, magnesium, sodium, potassium and other salts found in oil well brines, without the production of precipitates detrimental to the stability of such emulsions. It has been found that the soaps made of fatty acids containing 10 to 22 carbon atoms and the polyalkanolamines such as di- or tri-ethanolamine, are entirely satisfactory. The sodium, potassium or ammonium salts of mahogany petroleum sulfonates are also satisfactory. The mahogany sulfonates are well known in the petroleum industry as the oil soluble sulfonic acids produced by the sulfonation of petroleum oils. These sulfonic acids may be neutralized with alkaline bases and extracted from the containing oil with alcohol-water mixtures which diluents are subsequently removed by distillation.

Preferably the sodium salt of mahogany petroleum sulfonates is used because of the ready availability of such material and the complete solubility of this product in most hydrocarbon oils. Many commercially available emulsifiers are suitable and would come within the scope of my invention if, when mixed with a hydrocarbon oil, the resulting product is readily emulsifiable with water or brines. It has been found convenient to employ about 5 to 25 weight percent of the emulsifier based on the total weight of the emulsifier-containing hydrocarbon oil composition. It will be recognized, however, that the amount of emulsifier employed can depend on such factors as the choice of emulsifier and the type of hydrocarbon oil chosen, which factors are within the purview of skilled artisans.

Also available as a complete "emulsifiable" oil suitable for use in the present invention, are the so-called "soluble cutting oils" used in the metal forming industry where they are mixed with water for use as lubricants and coolants on metal cutting tools. Such products generally contain hydrocarbon oils having a Saybolt viscosity range of 40 to 100 seconds at 100° F and proprietary emulsifiers selected or formulated under closely guarded conditions.

b. The ethylene oxide adduct of an ester of a polyalkanolamine and a high molecular weight polybasic fatty acid employed in the present invention can be prepared by conventional methods. The preferred polyalkanolamines are the di- and tri-ethanolamines or mixtures thereof. There are available from several sources "alkanolamine bottoms" produced as by-products during the manufacture of ethanolamines. These "-bottoms" are usually a mixture of di- and tri-ethanolamines and it has been found that such a mixture, preferably high in triethanolamine is well suited to the production and efficacy of the additive of this invention and is substantially cheaper than the commercial grades of the polyethanolamines.

Polybasic fatty acids for preparation of an ester suitable for use in the present invention consist primarily of dimer and trimer acids having a molecular weight ranging from about 400 to 1,000, which are formed by polymerizing or dimerizing fatty acids containing 14 to 22 carbon atoms. Such products are commercially available. Also available are mixtures of dibasic and tribasic fatty acids having an apparent molecular weight of about 500 to 800 and obtained from the decomposition of castor oil as a by-product during the manufacture of sebacic acid. This latter product is preferably employed in the practice of this invention because of economic considerations.

For complete esterification each acid hydrogen of the polybasic fatty acid would require one (OH) radical from the polyalkanolamine. It has been found that it is desirable to have an excess of (OH) radicals and preferably that there be used sufficient polyalkanolamine to supply two to three (OH) groups for each available acid hydrogen. Determination of the available acid hydrogen and (OH) groups, in the raw materials being used, can be readily determined by well known laboratory procedures.

Ester preparation requires removal of the water formed by the reaction and temperatures up to 350° F may be required. It is preferable to remove the water by azeotropic distillation with a solvent such as xylene at temperatures around 200° to 230° F. The use of from 0.1 to 1 percent by weight of an acid catalyst is desirable in order to obtain more complete esterification. The manufacture of esters is too well known to warrant further discussion. Using the designated ingredients, esters suitable for the purpose of the present invention may be made by either the high temperature method or by azeotropic distillation for water removal.

An ester such as described above is susceptible to oxyethylation by usual methods. This may be due to the presence of free (OH) groups of the polyalkanolamine molecule which were not satisfied because less than stoichiometric amounts of polybasic fatty acids were used in preparation of the ester, as explained above.

The amount of ethylene oxide necessary to produce water solubility of the finished product will range from 80 to 120 percent by weight of the ester. The addition reaction can be effected by adding ethylene oxide in liquid or gaseous form to said ester at a temperature of about 300° to 360° F and a pressure ranging from about 10 to 75 psig using an alkaline catalyst such as sodium hydroxide or sodium methylate in the amount of 0.5 to 1.0 percent by weight of the ester. Obviously, any conventional process for producing such ethylene oxide adducts can be employed.

c. As the water soluble surfactant employed in the novel additive of this invention, many common types of surfactants are satisfactory insofar as performance is concerned. Such types include but are not limited to the sodium, potassium, ammonium, amine and alkanolanime soaps of common natural fats such as lard, tallow, soybean oil, castor oil or similar soaps of saturated or unsaturated fatty acids containing from 12 to 22 carbon atoms per molecule. Dimer and trimer acids formed by polymerization of these same fatty acids can also be used in the soap preparation, as can the sulfated or sulfonated products from the above named fats and fatty acids.

Other water soluble products having suitable surface active properties include sulfated and oxyethylated alcohols and glycols containing eight to 20 carbon atoms per linear chain. Also included are water soluble polymers of alkylene oxides and the ethylene oxide adducts of phenols and alkylated phenols.

Any of the above can be used but preferably there is employed the alkanolamine soap of a fatty acid wherein the alkanolamine used is mono-,di-or tri-ethanolamine or mixtures thereof and the fatty acid contains 12 to 22 carbon atoms per molecule. Mixtures or dimers and trimers of such fatty acids are also satisfactory for this use. Since the reaction used in preparing soaps of this type releases no water, the resulting soaps are more easily combined into stable mixtures with other components of the present additive.

A soap prepared from a crude grade of triethanolamine and mixed fatty acids having a combining weight of about 160, used in stoichiometric amounts has proved a very satisfactory surfactant and possesses exceptionally good blending characteristics.

The following examples serve to illustrate the invention.

EXAMPLE 1

A drilling fluid additive made in accordance with the present invention had the following composition:

| | | Volume Percent |
|---|---|---|
| A. | Emulsifiable Oil - A commercial "soluble cutting oil" wherein the hydrocarbon oil component is a Gulf Coast neutral lubricating oil having a Saybolt viscosity of about 100 seconds at 100°F. | 80 |
| B. | Oxyalkylated Ester - An ester of "alkanolamine bottoms" having a triethanolamine equivalent of 96 percent and a polybasic fatty acid from castor oil decomposition having an apparent molecular weight of 600, which ester was reacted with 100 percent by weight of ethylene oxide based on the weight of the ester. | 16 |
| C. | Water Soluble Surfactant - Soap of crude triethanolamine and mixed fatty acids having a combining weight of 160, used in stoichiometric amounts. | 4 |

The above additive was added to a conventional drilling mud comprising an aqueous suspension of clay at 2:45 P.M. at the rate of 1.5 gallons of additive per minute on a Gulf Coast offshore well. The well deviated 27° from the vertical and was being drilled at a depth of 9,600 feet. The addition of the additive was continued until a concentration of one-fourth of one percent was attained, based on the total volume of drilling mud in the system. The following observations and data were recorded:

| | I | II | III |
|---|---|---|---|
| Time | 2:45 p.m. | 4:30 p.m. | 6:00 p.m. |
| Mud Weight – lb/gal. | 13.2 | 13.2 | 13.2 |
| Viscosity – sec. | 44 | 46 | 43 |
| Pump Speed – spm* | 91 | 91 | 99 |
| Pump Pressure – psig | 2800 | 2650 | 2800 |
| Rotary Speed – rpm | 140 | 140 | 140 |
| Rotary Load – amps | 350 | 250 | 225 |
| Mud Agitator Load – amps | 20 | 18 | 18 |
| Water Loss – cc/100cc | 8.0 | | 7.6 |
| Wall Cake | Soft | | Thin, tough |
| Chlorides – ppm | 18,000 | | |
| Alkalinity – ppm | 1.4 | | |
| Frictional Drag – lb. | 125,000 | | 65,000 |

*spm – strokes per minute

The calculated time for displacement of the drilling mud in the hole was 2⅓ hours. Data recorded under Column II shows that displacement was essentially complete in 1¾ hours, indicating an increased circulation rate attributable to a reduction of friction. This was further confirmed by a substantial decrease in pump pressure.

The reduction in friction, while maintaining a constant rotary speed, is clearly indicated by the tremendous drop in rotary load amperage and a definite decrease in the mud agitator amperage.

The tests also show a definite improvement in wall cake characteristics. Further, it can be seen from the data that a nearly 50 percent reduction of frictional drag, as defined above, was attained. Compare, for instance, these values reported with those in Column I when none of the additive of this invention was present.

This test was continued for approximately 6 days until a total depth of 12,600 feet was accomplished and essentially the same results as reported in column III were achieved.

EXAMPLE 2

A Gulf Coast off-shore well was being reamed to bottom when salt water broke into the well bore at the rate of 700 BD. The drilling mud used during this operation contained one-fourth of one percent of the drilling fluid additive of this invention. This additive had the following composition:

| | | Volume Percent |
|---|---|---|
| A. | Emulsifiable Oil - A commercial "soluble cutting oil" wherein the hydrocarbon oil component is a Gulf Coast neutral lubricating oil having a Saybolt viscosity of about 100 seconds at 100°F. | 80 |

B. Oxyalkylated Ester - An ester of "alkanolamine bottoms" having a triethanolamine equivalent of 96 percent and a polybasic fatty acid from castor oil decomposition having an apparent molecular weight of 600, which ester was reacted with 100 percent by weight of ethylene oxide based on the weight of the ester.   16

C. Water Soluble Surfactant - Soap of crude triethanolamine and mixed fatty acids having a combining weight of 160, used in stoichiometric amounts.   4

Notwithstanding the fact that the chloride content of the mud reached 70,000 ppm the mud remained stable and performance was excellent. After some delay due to lost circulation, reaming was resumed using a conventional mud, not containing the additive of this invention. At a chloride content of 28,000 ppm, this conventional mud thickened badly and became unsatisfactory. Thereafter, one-fourth of one percent of a drilling fluid additive having essentially the same composition described immediately above was added to the thickened mud and within 3 hours the drilling mud was uniformly stable and performance was entirely satisfactory even at the very high chloride content.

As is well known, conventional muds are sensitive to a high inorganic salt content of the water used in making the mud or of brine encountered in drilling operations. The above tests indicate that the novel additive of this invention greatly decreases this disadvantage.

EXAMPLE 3

During rotary drilling operations the drilling mud system frequently becomes contaminated with cement used in normal pipe cementing procedures. This usually results in serious changes in mud characteristics due to the presence therein of inorganic salts in the cement. The following tests were made to determine the effect of cement on a conventional drilling mud composition, both with and without the additive of the present invention which had the following composition:

|   |   | Volume Percent |
|---|---|---|
| A. | Emulsifiable Oil - A commercial "soluble cutting oil" wherein the hydrocarbon oil component is a Gulf Coast neutral lubricating oil having a Saybolt viscosity of about 100 seconds at 100°F. | 80 |
| B. | Oxyalkylated Ester - An ester of "alkanolamine bottoms" having a triethanolamine equivalent of 96 percent and a polybasic fatty acid from castor oil decomposition having an apparent molecular weight of 600, which ester was reacted with 100 percent by weight of ethylene oxide based on the weight of the ester. | 16 |
| C. | Water Soluble Surfactant - Soap of crude triethanolamine and mixed fatty acids having a combining weight of 160, used in stoichiometric amounts. | 4 |

Ten percent of fresh cement was thoroughly mixed with the drilling mud and the results were recorded:

| Time | Mud Without Additive | Mud plus 1/4 volume % of additive |
|---|---|---|
| 10 minutes | thick | slightly thick |
| 30 minutes | gelled | thick |
| 24 hours | solid | thick gell |

This again demonstrates the increased tolerance of inorganic salts by the drilling fluid obtained by the use of the additive of this invention.

It has also been observed that the use of the specific ingredients which constitute the drilling fluid additive of this invention, when used alone or in combination with materials other than those specified in the composition of the present additive, do not provide the advantages attainable by the present invention.

What is claimed is:

1. A drilling fluid additive composition consisting essentially of:

a. 25 to 90 volume percent of an emulsifiable hydrocarbon oil consisting essentially of a fluid hydrocarbon oil having a Saybolt viscosity of 35 – 200 at 100° F and an emulsifier present in an amount of 5 – 25 weight percent based on the total weight of the oil-emulsifier mixture to provide a stable emulsion of said oil and high calcium brines, said emulsifier being selected from the group consisting of (1) a soap of a fatty acid containing 10 – 22 carbon atoms and a polyalkanol-amine selected from the group consisting of di- and tri-ethanolamine, and (2) the sodium, potassium and ammonium salts of mahogany petroleum sulfonate, and b. 5 to 50 volume percent of an ethylene oxide adduct of an ester formed from a polyalkanolamine selected from the group consisting of diethanolamine, triethanolamine and mixtures thereof and a mixture of dibasic and tribasic fatty acids having a molecular weight ranging from about 500 to 800 obtained from decomposition of castor oil, wherein the polyalkanolamine is used in amounts sufficient to provide 1 – 3 hydroxyl groups for each available acid hydrogen and wherein the ethylene oxide in said adduct is present in amounts ranging from 80 to 120 percent by weight of said ester.

2. The drilling fluid additive composition of claim 1 also including 0–5 volume percent of a water-soluble surfactant selected from the group consisting of sulfated and oxyethylated alcohols and glycols containing eight to 20 carbon atoms per linear chain.

3. The drilling fluid additive composition of claim 1 also including 0–5 volume percent of a water-soluble surfactant selected from the group consisting of water-soluble polymer of alkylene oxide and ethylene oxide adduct of phenol and alkylated phenol.

4. A drilling fluid additive of claim 1 also including 0 to 5 volume percent of a water soluble surfactant selected from the group consisting of the sodium, potassium, ammonium and alkanolamine soaps of a member selected from the group consisting of (A) a material selected from the group consisting of lard, tallow, soybean oil and castor oil; (B) a dimer or trimer acid formed by polymerization of a fatty acid containing 12 – 22 carbon atoms; and (C) a sulfated or sulfonated product of the material identified in (A) or (B) above, said alkanolamine being selected from the group consisting of mono-, di- and tri-ethanolamine and mixtures thereof.

5. The drilling fluid additive composition of claim 1 wherein said emulsifiable hydrocarbon oil is present in an amount of 75 volume percent, said ethylene oxide adduct of said ester is present in an amount of 20 volume percent and said water-soluble surfactant is present in an amount or a 5 volume percent of said composition.

6. A drilling fluid consisting essentially of an aqueous suspension of solids and the drilling fluid additive of claim 1 wherein said additive is present in amounts of 1 to 100 parts by volume to 2,000 parts by volume of the aqueous suspension of solids.

7. A drilling fluid consisting essentially of an aqueous suspension of solids and the drilling additive of claim 4 wherein said additive is present in the amount of 1 to 100 parts by volume to 2,000 parts by volume of the aqueous suspension of solids.

8. The drilling fluid of claim 7 wherein said drilling additive consists essentially of 75 volume percent of said emulsifiable hydrocarbon oil, 20 volume percent of said ethylene oxide adduct of said ester and 5 volume percent of said water-soluble surfactant.

9. A drilling fluid additive composition consisting essentially of:

a. 25 to 90 volume percent of an emulsifiable hydrocarbon oil consisting essentially of a fluid hydrocarbon oil having a Saybolt viscosity of 35 – 200 at 100° F and an emulsifier present in an amount of 5 – 25 weight percent based on the total weight of the oil-emulsifier mixture to provide a stable emulsion of said oil in water and high calcium brines, said emulsifier being selected from the group consisting of (1) a soap of a fatty acid containing 10 – 22 carbon atoms and a polyalkanol-amine selected from the group consisting of di- and tri-ethanolamine, and (2) the sodium, potassium and ammonium salts of mahogany petroleum sulfonate, and b. 5 to 50 volume percent of an ethylene oxide adduct of an ester formed from a polyalkanolamine selected from the group consisting of diethanolamine, triethanolamine and mixtures thereof and a high molecular weight polybasic fatty acid selected from the group consisting of dimer and trimer acids having a molecular weight ranging from about 400 to 1,000 obtained from fatty acids containing 12 – 22 carbon atoms, wherein the polyalkanolamine is used in amounts sufficient to provide 1 – 3 hydroxyl groups for each available acid hydrogen and wherein the ethylene oxide in said adduct is present in amounts ranging from 80 to 120 percent by weight of said ester.

10. In a process for drilling a well with rotary well drilling equipment wherein a drilling fluid consisting essentially of an aqueous suspension of solids is circulated in the well bore, the method of decreasing power requirements for rotating the drilling tools and for lifting said well drilling tools from said well bore which comprises utilizing as said drilling fluid a drilling fluid consisting essentially of an aqueous suspension of solids and a drilling fluid additive, said additive being present in amounts of 1 – 100 parts by volume to 2,000 parts by volume of the aqueous suspension of solids, said drilling fluid additive consisting essentially of a. 25 to 90 volume percent of an emulsifiable hydrocarbon oil consisting essentially of a fluid hydrocarbon oil having a Saybolt viscosity of 35 – 200 to 100° F and an emulsifier present in an amount of 5 – 25 weight percent based on the total weight of the oil-emulsifier mixture to provide a stable emulsion of said oil in water and high calcium brines, said emulsifier being selected from the group consisting of (1) a soap of a fatty acid containing 10 – 22 carbon atoms and a polyalkanolamine selected from the group consisting of di- and tri-ethanolamine and (2) the sodium, potassium and ammonium salts of mahogany petroleum sulfonate, and b. 5 to 50 volume percent of an ethylene oxide adduct of an ester formed from a polyalkanolamine selected from the group consisting of diethanolamine, triethanolamine and mixtures thereof and a mixture of dibasic and tribasic fatty acids having a molecular weight ranging from about 500 to 800 obtained from decomposition of castor oil, wherein the polyalkanolamine is used in amounts sufficient to provide 1 – 3 hydroxyl groups for each available acid hydrogen and wherein the ethylene oxide in said adduct is present in amounts ranging from 80 to 120 percent by weight of said ester.

11. The process of claim 10 wherein said drilling fluid additive also includes 0 to 5 volume percent of a water soluble surfactant selected from the group consisting of the sodium, potassium, ammonium and alkanolamine soaps of a member selected from the group consisting of: (A) a material selected from the group consisting of lard, tallow, soybean oil and castor oil; (B) a dimer or trimer acid formed by polymerization of a fatty acid containing 12 – 22 carbon atoms; and (C) a sulfated or sulfonated product of the material identified in (A) or (B) above, said alkanolamine being selected from the group consisting of mono-, di- and tri-ethanolamine and mixtures thereof.

12. The process of claim 11 wherein said emulsifiable hydrocarbon oil is present in an amount of 75 volume percent, said ethylene oxide adduct of said ester is present in an amount of 20 volume percent and said water-soluble surfactant is present in an amount of 5 volume percent of said drilling fluid additive.

13. In a process for drilling a well with rotary well drilling equipment wherein a drilling fluid consisting essentially of an aqueous suspension of solids is circulated in the well bore, the method of decreasing power requirements for rotating the drilling tools and for lifting said well drilling tools from said well bore which comprises utilizing as said drilling fluid a drilling fluid consisting essentially of an aqueous suspension of solids and a drilling fluid additive, said additive being present in amounts of 1 – 100 parts by volume to 2,000 parts by volume of the aqueous suspension of solids, said drilling fluid additive consisting essentially of a. 25 to 90 volume percent of an emulsifiable hydrocarbon oil consisting essentially of a fluid hydrocarbon oil having a Saybolt viscosity of 35 – 200 at 100° F and an emulsifier present in an amount of 5 – 25 weight percent based on the total weight of the oil-emulsifier mixture to provide a stable emulsion of said oil in water and high calcium brines, said emulsifier being selected from the group consisting of (1) a soap of a fatty acid containing 10 – 22 carbon atom and polyalkanolamine selected from the group consisting of di- and tri-ethanolamine and (2) the sodium, potassium and ammonium salts of mahogany petroleum sulfonate, and b. 5 to 50 volume percent of an ethylene oxide adduct of an ester formed from a polyalkanolamine selected from the group consisting of diethanolamine, triethanolamine and mixtures thereof and a high molecular weight polybasic fatty acid selected from the group consisting of dimer and trimer acids having a molecular weight ranging from about 400 – 1,000 obtained from fatty acids containing 12 – 22 carbon atoms, wherein the polyalkanolamine is used in amounts sufficient to provide 1 – 3 hydroxyl groups for each available acid hydrogen and wherein the ethylene oxide in said adduct is present in amounts ranging from 80 to 120 percent by weight of said ester.

* * * * *